United States Patent [19]

Turczyk et al.

[11] Patent Number: 4,795,767

[45] Date of Patent: Jan. 3, 1989

[54] CAN CARRIER COMPOSITION

[75] Inventors: Michael J. Turczyk, Yonkers, N.Y.; George M. Harlan, Bridgewater, N.J.

[73] Assignee: Union Carbide Corporation, Danbury, Conn.

[21] Appl. No.: 102,736

[22] Filed: Sep. 30, 1987

[51] Int. Cl.$^4$ .......................... C08K 9/00; C08K 5/49; C08L 23/06

[52] U.S. Cl. ...................... 523/200; 523/215; 524/100; 524/120; 524/147; 524/487; 524/528; 206/145; 206/150; 206/427

[58] Field of Search ................ 523/200, 215; 524/100, 524/120, 147, 528, 487; 206/145, 150, 427

[56] References Cited

U.S. PATENT DOCUMENTS

| | | | |
|---|---|---|---|
| Re. 29,873 | 1/1979 | Cunningham | 206/150 |
| 3,597,382 | 8/1971 | Foster . | |
| 4,064,100 | 12/1977 | Hechenbleikmer | 524/100 |
| 4,082,877 | 4/1978 | Shadle | 525/201 |
| 4,112,158 | 9/1978 | Creekmore et al. | 524/226 |
| 4,261,880 | 4/1981 | Fujii et al. . | |
| 4,302,383 | 11/1981 | Valdiserri et al. | 524/120 |
| 4,353,972 | 10/1982 | Helling et al. . | |
| 4,385,691 | 5/1983 | Klygis | 206/150 |
| 4,394,473 | 7/1983 | Winter et al. | 524/226 |
| 4,394,474 | 7/1983 | McKinney et al. . | |
| 4,425,268 | 1/1984 | Cooper | 524/487 |
| 4,454,272 | 6/1984 | McKinney et al. . | |
| 4,467,061 | 8/1984 | Yamamoto et al. | 524/528 |
| 4,574,949 | 3/1986 | Rhoads | 206/150 |
| 4,587,303 | 5/1986 | Turtle | 524/528 |
| 4,661,537 | 4/1987 | Ancker et al. | 523/200 |

FOREIGN PATENT DOCUMENTS 1175974 10/1984 Canada .................. 524/528

Primary Examiner—Herbert J. Lilling
Attorney, Agent, or Firm—Saul R. Bresch

[57] ABSTRACT

A can carrier composition comprising at least one of each of the following components wherein all parts are by weight based on 100 parts by weight of component (i):

(i) a high pressure polyethylene having a density in the range of about 0.918 to about 0.930 gram per cubic centimeter;

(ii) a linear polyethylene having a density of less than about 0.925 gram per cubic centimeter in an amount of about 2 to about 35 parts;

(iii) polyethylene wax in an amount of about 0.5 to about 5 parts;

(iv) a mineral filler coated with a metal salt of a fatty acid in an amount of about 0.05 to about 0.50 parts;

(v) a secondary amide in an amount of about 0.02 to about 0.15 part;

(vi) an antioxidant in an amount of about 0.02 to about 0.10 part; and (vii) an organic phosphorus compound in an amount of about 0.005 to about 0.05 part.

8 Claims, No Drawings

CAN CARRIER COMPOSITION

TECHNICAL FIELD

This invention relates to polymer compositions used to prepare plastic carriers for cans containing various carbonated beverages, usually in packages of six, and methods for compounding these compositions to prepare them for extrusion.

BACKGROUND ART

Plastic carriers for the so-called "six-pack" have been on super market shelves for many years. They are usually made by die cutting from extruded sheet. Slip additives and antiblock agents are included in the pre-extrusion can carrier composition to impart the surface properties which enhance die cutting and the application of the carrier to cans. Historically, primary fatty acid amides such as erucamide and oleamide have served as slip additives and silica has performed the function of antiblock agent. However systems using these components have had drawbacks, e.g. accelerated dulling of punch tooling and grinder blades caused by the very hard silica; plateout of the amide onto the punch press feed rollers and dies, adversely affecting the dimensions of the carriers punched; and failing to allow "facing" of the cans in the carrier. "Facing" is the purposeful twisting of cans in a six-pack to align their logos for the sake of appearance on store shelves. Soft drinks sweetened with cane syrup can have sufficient spillage residue to adhere the cans to carriers applied later. Any subsequent effort to twist those cans for the purpose of "facing" can cause the carrier to rupture rather than permitting the can to turn easily unless a slip additive is present. These problems have been solved by using a secondary amide such as erucyl erucamide as a slip additive and talc coated with zinc stearate as an antiblock agent.

The art is still seeking can carrier compositions with improved environmental stress crack resistance to resist the rupture and subsequent can fall out caused by cracks in the carriers that occur when stressed carriers are subjected to wetting media, e.g., detergent solution, especially in warm environments. As will be seen hereinafter, however, the provision of such compositions leads to associated problems, which must be solved.

DISCLOSURE OF THE INVENTION

An object of this invention, therefore, is to provide a can carrier composition with improved environmental stress crack resistance while maintaining a shear/viscosity curve similar to those of high pressure low density polyethylenes and preventing color formation, and, further, essentially eliminating a process problem arising because of effected compositional changes. The latter is accomplished by an adjustment both in the proposed composition and the method for compounding same.

Other objects and advantages will become apparent hereinafter.

According to the invention the above object is met by the following composition and alternative methods for preparing same.

The can carrier composition comprises at least one of each of the following components wherein all parts are by weight based on 100 parts by weight of component (i):

(i) a high pressure polyethylene having a density in the range of about 0.918 to about 0.930 gram per cubic centimeter;
(ii) a linear polyethylene having a density of less than about 0.925 gram per cubic centimeter in an amount of about 2 to about 35 parts by weight;
(iii) polyethylene wax in an amount of about 0.5 to about 5 parts by weight;
(iv) a mineral filler coated with a metal salt of a fatty acid in an amount of about 0.05 to about 0.50 part by weight;
(v) a secondary amide in an amount of about 0.02 to about 0.15 part by weight;
(vi) an antioxidant in an amount of about 0.02 to about 0.10 part by weight; and
(vii) an organic phosphorus compound in an amount of about 0.005 to about 0.05 part by weight.

One method for preparing the foregoing composition comprises the following steps:
(a) admixing components (ii), (vi), and (vii) to form a masterbatch; and
(b) admixing the masterbatch of step (a) with components (i), (iii), (iv), and (v), and an additional amount of component (vi).

The alternative method comprises the following steps:
(a) admixing all components except component (i) to form a masterbatch; and
(b) admixing the masterbatch of step (a) with component (i).

DETAILED DESCRIPTION

Component (i) is a high pressure polyethylene having a density in the range of about 0.918 to about 0.930 gram per cubic centimeter and a melt index in the range of about 0.2 to about 2.0 grams per 10 minutes. High pressure polyethylenes and the process for making them are well known and are described in Introduction to Polymer Chemistry, Stille, Wiley and Sons, New York, 1962, pages 149 to 153.

The parts by weight of the other components of the composition are based on 100 parts by weight of component (i).

Component (ii) can be either a linear low density polyethylene having a density in the range of about 0.915 to 0.925 gram per cubic centimeter and a melt index in the range of about 0.1 to about 1.5 grams per 10 minutes or a very low density polyethylene (also linear) having a density in the range of about 0.880 to about 0.915 gram per cubic centimeter and a melt index in the range of about 0.2 to about 2.0 grams per 10 minutes. Both the linear low density and the very low density polyethylenes and methods for preparing them have also been described in the literature, the linear low density polyethylene, e.g., in U.S. Pat. No. 4,101,445 issued on July 18, 1978 and the very low density polyethylene, e.g., in European Patent Applicant No. 0 120 501 published on Oct. 3, 1984. Component (ii) can be present in the composition in an amount of about 2 to about 35 parts by weight and is preferably used in an amount of about 12 to about 28 parts by weight.

Component (iii) is a polyethylene wax, which can be described as a low molecular weight (below about 10,000) polyethylene. It can have a density in the range of about 0.915 to about 0.925 gram per cubic centimeter. Polyethylene wax is a known processing aid useful in the extrusion of various polymers. The addition of the polyethylene wax is considered to cause a shift in the shear/viscosity curve of the composition to approximate that of component (i) when high pressure polyethylene is used as the only resin. The polyethylene wax can be present in the composition in an amount of about 0.5 to about 5.0 parts by weight and is preferably present in an amount of about 3 to about 4 parts by weight.

Component (iv) is a mineral filler coated with a metal salt of a fatty acid. Suitable mineral fillers are talc, aluminum trihydrate, antimony oxide, barium sulfate, calcium silicate, molybdenum oxide, red phosphorus, zinc borate, clay, and calcium or magnesium salts or bases. Talc and the calcium and magnesium salts or bases are preferred. These mineral fillers are coated with a metal salt of a fatty acid. The metal of the metal salt is taken from Groups IA and II of the Periodic Table. Preferred metals are calcium and zinc. The fatty acids have 8 to 20 carbon atoms and are exemplified by such acids as palmitic, stearic, lauric, oleic, sebacic, ricinoleic, and palmitoleic. Stearic acid is preferred. Preferred metal salts are calcium stearate and zinc stearate. The coated filler can be introduced into the composition in amounts of about 0.05 to about 0.50 parts by weight, preferably about 0.3 to about 0.4 parts by weight. The filler serves as an antiblock agent. It provides good surface properties while being less abrasive to tooling or grinder blades.

Component (v) is a secondary amide useful as a slip additive. Together with the coated filler, proper slip is achieved. The secondary amides are generally fatty acid amides having the formula:
ti RCONHR' wherein R and R' can be alkyl or alkenyl groups having 10 to 26 carbon atoms. Examples of useful secondary amides are oleyl palmitamide, stearyl erucylamide, stearyl stearamide, erucyl erucylamide, and oleyl erucylamide. Other secondary amides, which can be used, are mentioned in U.S. Pat. No. 3,597,382 issued on Aug. 3, 1971. An amount of about 0.02 to about 0.15 part by weight of secondary amide, and preferably about 0.08 to about 0.12 part by weight, can be used in subject composition. This additive is used to control the rate of exudation or migration to the surface of the extruded can carrier sheet in order to eliminate plateout onto indexing rolls during punching operations. The secondary amide also improves can faceability.

The sixth component is a conventional antioxidant, which can be used in an amount in the range of about 0.02 to about 0.10 part by weight and is preferably included in the composition in an amount of about 0.05 to about 0.08 part by weight. Examples of useful antioxidants are pentaerythritol tetrakis (3,5-ditert-butyl-4-hydro phenyl propionate) and polymerized 1,2-dihydro-2,2,4-trimethyl quinoline. Other examples of antioxidants are stearically hindered phenols such as tetrakis [methylene(3,5-di-tert-butyl-4-hydroxy hydrocinnamate)] methane; thiodiethylene bis(3,5-di-tert-butyl-4-hydroxy)hydrocinnamate; 1,3,5-trimethyl-2,4,6-tris(3,5,-di-tertiary butyl-4-hydroxybenzyl)benzene; 1,3,5-tris (3,5-di-tertiary butyl-4-hydroxy benzyl) -5-triazine-2,4,6-(1H,3H,5H)trione; tetrakis [methylene-3-(3', 5-di-t-butyl-4'-hydroxy phenyl)-propionate]methane; di(2-methyl-4-hydroxy-5-t-butyl phenyl)sulfide; and amines other than the quinoline mentioned above.

Component (vii) is an organic phosphorous compound, which serves to prevent color formation in the linear low density polyethylene or the very low density polyethylene caused by residual catalyst and other impurities. The organic phosphorus compound can be used in an amount in the range of about 0.005 to about 0.050 part by weight and is preferably included in the composition in an amount of about 0.010 to about 0.015 part by weight. It is specifically used to prevent yellowing, which occurs in compounding and extrusion. While distearyl pentaerythritol diphosphite is preferred, many other phosphites are useful in subject composition. The former is described in U.S. Pat. No. 4,064,100 issued on Dec. 20, 1977 while other phosphites are discussed in U.S. Pat. No. 4,261,880 issued on Apr. 14, 1981. Examples of various phosphites are:

Trimethylphosphite, tri-butylphosphite, tridecylphosphite, tris(2-ethylhexyl)phosphite, trinonylphosphite, tricetylphosphite, dilauryl hydrogen phosphite, tricyclohexylphosphite, triphenylphosphite, tribenzylphosphite, tricresylphosphite, tri-p-nonylphenylphosphite, diphenyldecylphosphite, tris(dinonylphenyl)phosphite, tris(2,4-di-t-butylphenyl)phosphite, tris(4-α-methylbenzylphenyl)phosphite, tris(octylthioethyl)phosphite, tris(octylthiopropyl)phosphite, tris(-cresylthiopropyl)phosphite, tetraphenyldipropyleneglycoldiphosphite, 4,4'-butylidenebis(3-methyl-6-t-butylphenyl -ditridecyl)-phosphite, which also may be named 1,1-bis(3-t-butyl-4[bis-(tridecyloxy)phosphino-oxy]-6-methylphenyl)-butane, 1,1,3-tris(3-t-butyl -4[bis(tridecyloxy)phosphino-oxy]-6-methylphenyl)-butan e, bis(2-chloropropyl)pentaerythritoldiphosphite, bisphenylpentaerythritoldiphosphite, bisstearylpentaerythritoldiphosphite, and trilauryltrithiophosphite.

It will be understood that mixtures of each of the above mentioned components can be used if desired. Further, patent applications, patents, and other publications mentioned in this specification are incorporated by reference herein.

Other conventional additives such as ultraviolet absorbers, antistatic agents, pigments, dyes, and metal salts, or other materials that provide photo degradability, can be used in the can carrier composition.

Two processes are proposed for compounding the seven components of subject composition. As noted, the first process comprises preparing a masterbatch by mixing components (ii), (vi), and (vii). The masterbatch is then mixed with components (i), (iii), (iv), and (v), and an additional amount of component (vi), the antioxidant. The additional antioxidant will not take component (vi) outside the suggested range, however. The other method comprises mixing all of the components except component (i) to form the masterbatch. Then, component (i) is added.

In the extrusion of similar can carrier compositions containing phosphites, it was found that there was a build up of phosphites (called "char") in the extruder at the point at which the composition exited the die. The char is caused by a reaction between the metal of the die and the phosphite. The char scratches the extruded film or sheet which, not only marks the film, but causes the film to be weak at the scratch point leading to future film damage. It is found that subject can carrier composition compounded as above avoids char, and utilizes about 20 percent by weight of the phosphite used in conventional can carrier compositions while still essentially avoiding color formation. Further, environmental stress crack resistance is improved more than fivefold over conventional can carrier compositions made with high pressure polyethylene. Reduced viscosity at high shear rates, internal lubrication, essentially no sweat-out of the slip additive during the can carrier stamping operation, and essentially no yellowing of virgin and regrind product are observed.

The invention is illustrated by the following example. Parts are by weight.

EXAMPLE

The components of the can carrier composition compounded in this example by dry blending are as follows:
 (i) high pressure low density polyethylene in pellet form having a melt index of 0.46 and a density of 0.9238 gram per cubic centimeter: 100 parts.
 (ii) linear low density polyethylene having a melt index of 0.6 to 0.8 and a density of 0.920 gram per cubic centimeter: 26.08 parts.
 (iii) polyethylene wax having a density of 0.920 gram per cubic centimeter: 3.92 parts.
 (iv) zinc stearate coated talc: 0.33 part.
 (v) erucyl erucamide: 0.10 part.
 (vi) pentaerythritol tetrakis (3,5-di-tert-butyl-4-hydro phenyl propionate): 0.07 part.
 (vii) distearyl pentaerythritol diphosphite: 0.01 part.

I. A masterbatch of components (ii) and (vii) and half of component (vi) is compounded. This materbatch is then compounded with components (i), (iii), (iv), (v) and the remaining half of component (vi).

II. A masterbatch of all the components except component (i) is compounded and then the masterbatch is compounded with 100 parts of component (i).

Compositions I and II are extruded into approximately 0.020 inch thick flat sheeting by conventional means such as described in Principles of Polymer Processing, Tadmor and Gogos, Wiley Interscience (SPE series), 1979, incorporated by reference herein. The shear rate/viscosity relationships of the compositions are such that they are readily extruded with no undue variation from conditions used to extrude current commercial products used in can carriers. The sheeting is then passed through a continuously operating punch press, which converts it into continuous lengths of carriers for later application to beverage cans. Results of the extrusion and die punching are no plate-out of material from the compositions onto any portion of the processing equipment, which would interfere with the efficiency of the process. The sheet surfaces attain coefficients of friction (typically about 0.15 to about 0.25) such that typical maximum speed punching and reeling of the carrier webs is achieved within 24 hours after the extrusion step. The color of the sheet is typical of well stabilized polyethylene with no discernible yellowing appearance. There is no build-up of char on the die lips or the extrusion line that would cause scratching of the sheet during its manufacture. By standard Environmental Stress Crack Resistance tests (ASTM D-1693), failures of these compounds occur only after, typically, five times as long a period than for current commercial products used for can carriers.

We claim:

1. A can carrier composition comprising the following components wherein all parts are by weight based on 100 parts by weight of component (i):
 (i) a high pressure polyethylene having a density in the range of about 0.918 to about 0.930 gram per cubic centimeter and a melt index in the range of about 0.2 to about 2.0 grams per 10 minutes;
 (ii) a linear polyethylene having a density of less than about 0.925 gram per cubic centimeter and a melt index in the range of about 0.1 to 2.0 grams per 10 minutes in an amount of about 2 to about 35 parts;
 (iii) polyethylene wax in an amount of about 0.5 to about 5 parts;
 (iv) a mineral filler coated with a metal salt of a fatty acid in an amount of about 0.05 to about 0.50 parts;
 (v) a secondary amide in an amount of about 0.02 to about 0.15 part;
 (vi) an antioxidant in an amount of about 0.02 to about 0.10 part; and
 (vii) an organic phosphorus compound in an amount of about 0.005 to about 0.05 part.

2. The can carrier composition defined in claim 1 wherein the components are present in about the following amounts:

| Component | Parts |
| --- | --- |
| (ii) | 12 to 28 |
| (iii) | 3 to 4 |
| (iv) | 0.3 to 0.4 |
| (v) | 0.08 to 0.12 |
| (vi) | 0.05 to 0.08 |
| (vii) | 0.010 to 0.015 |

3. A process for compounding the components defined in claim 1 comprising:
 (a) admixing components (ii), (vi), and (vii) to form a masterbatch; and
 (b) admixing the masterbatch of step (a) with components (i), (iii). (iv), and (v), and an additional amount of component (vi).

4. A process for compounding the components defined in claim 1 comprising:
 (a) admixing all of the components except component (i) to form a masterbatch; and (b) admixing the masterbatch of step (a) with component (i).

5. The product of the process defined in claim 3.

6. The product of the process defined in claim 4.

7. A process for preparing a film or sheet comprising extruding the product defined in claim 5 in such a manner that a film or sheet is formed.

8. A process for preparing a film or sheet comprising extruding the product defined in claim 6 in such a manner that a film or sheet is formed.

* * * * *